United States Patent [19]
Ganci

[11] Patent Number: 5,145,524
[45] Date of Patent: Sep. 8, 1992

[54] SURFACE MODIFIED PIGMENT COMPOSITIONS

[75] Inventor: James B. Ganci, Wilmington, Del.

[73] Assignee: Ciba-Geigy Corporation, Ardsley, N.Y.

[21] Appl. No.: 658,164

[22] Filed: Feb. 20, 1991

[51] Int. Cl.$^5$ .............. C09B 67/08; C09B 67/20; C09B 67/22

[52] U.S. Cl. .................. 106/493; 106/495; 106/496; 106/497; 106/498

[58] Field of Search ............ 106/493, 495, 496, 497, 106/498; 252.4/89

[56] References Cited

U.S. PATENT DOCUMENTS 4,055,439 10/1977 Bäbler et al. ............... 106/496

FOREIGN PATENT DOCUMENTS

WO86/03762 7/1986 PCT Int'l Appl.
WO86/03763 7/1986 PCT Int'l Appl.

OTHER PUBLICATIONS

CA 107 (10): 135827y, Hirano, 1987.

*Primary Examiner*—Theodore Morris
*Assistant Examiner*—David M. Brunsman
*Attorney, Agent, or Firm*—Harry Falber; Marla J. Mathias

[57] ABSTRACT

Surface modification of a variety of pigments, particularly quinacridone pigments, and the pigments resulting therefrom whereby the pigment is treated with a poly(-vinyl lower alkyl ether) and, optionally, with a dispersion-improving derivative of the primary pigment resulting in compositions exhibiting enhanced performance in automotive and other finish systems. The surface treatment also improves flow properties of the pigment in the aqueous phase of processing leading to higher solids content for direct application in waterborne systems.

21 Claims, No Drawings

SURFACE MODIFIED PIGMENT COMPOSITIONS

The present invention relates to surface modification of quinacridone, pyrrolopyrrole and other pigments in order to enhance their performance in modern automotive and other finish systems. In particular, the pigments are modified by treatment with a polymer which serves to enhance the interaction of the pigment with the dispersion system, including the vehicle (resin) and solvent(s) which make up the dispersion medium, and optionally with a derivative of the same pigment. This pigment modification leads to improved rheological characteristics of the dispersion, thus affording greater pigment concentrations and lower solvent emissions to the atmosphere during paint application. In addition, the modified products afford gloss and distinctness of image or mirror quality improvement to automotive and other similar finishes.

The modification of pigments by treating their surface with their own derivatives, forming blended pigment compositions, and the like, is well known in the art. For example, phthalimidomethylation of copper phthalocyanine is described in U.S. Pat. No. 2,761,868, and phthalimidomethyl quinacridone preparation and use is described in U.S. Pat. No. 3,275,637. Similarly, the preparation and use of sulfonated quinacridones is described in U.S. Pat. No. 3,386,843. Phthalimidomethylation of indanthrone, flavanthrone, pyranthrone, and perylenes is further described in U.S. Pat. No. 4,256,507. The use of these treating agents has a definite beneficial effect on rheology and finish appearance in some systems.

Frequently, performance of such treated pigments is system dependent, that is performance is affected by the type of vehicle (resin) and type of solvents used. For some systems, surface treatment of pigment with one of the derivatives mentioned earlier is not necessary. For other systems, even surface treated pigments do not perform adequately. This is particularly the case in modern high solids, low solvent systems, where pigment and system compatibility must be of a particularly high order to obtain finishes with high gloss and distinctness of image.

In seeking to alleviate this variability and obtain consistency of performance in certain paint systems, various polymeric products have been suggested for use. Thus, it was found that enhancement of these properties in certain paint systems could be achieved by the introduction unto a pigment treated with its own derivative of a polymeric dispersant which helps in stabilizing a dispersion, keeping it substantially deflocculated, thus affording lower viscosity and ultimately better finish appearance performance.

As representative of this group of polymeric dispersants, reference is made to basic nitrogen-containing copolymers of the polyurethane series as described in European 154,678, as particularly reflected in a commercially available polymeric material sold under the mark DISPERBYK 160 by BYK-Chemie and to chemical variations thereof in terms of molecular weight and the nature of the molecular moieties. This product is recommended as an additive in paint dispersion preparation in the form of a solution in xylene/butyl acetate, primarily the xylene solvent system in which said polymer is believed to be prepared. The presence of the polymer in solvent systems is generally reflective of all such materials.

However, the use of such solution form presents several problems. It requires the paint manufacturer to add another ingredient during dispersion preparation without having any control over the solvents going into the making of the dispersion. Since solvents frequently play a key role in the total stability of a given dispersion, such lack of control is particularly disadvantageous. In some cases, solvent incompatibility would preclude the use of currently available polymers.

In addition, PCT applications WO 86/03762 and WO 86/03763 disclose the addition of copolymers of the polyurethane series to pulverulent pigments, including quinacridone pigments, to improve rheological properties. Finally, U.S. Pat. No. 4,844,742 describes the use of such a polymeric material in solvent-free form. Certain benefits are obtained from this approach, including various performance improvements. However, additional improvement in rheological and finish properties are still desired.

Accordingly, it is the primary object of this invention to provide polymer-containing pigment compositions which exhibit improved rheological, flow and finish characteristics.

Various other objects and advantages of this invention will become apparent from the following description thereof.

It has now been determined that by treating a primary pigment with a poly(vinyl lower alkyl ether) optionally with a dispersion-improving derivative of the primary pigment, significantly improved pigment systems are obtained. Thus, it has been found that the polymer dissolved in water or a water-soluble diluent for ease of addition, can be introduced into an aqueous suspension of a pigment, whereupon the polymer comes out of solution and being organophilic associates itself with the pigment. The isolated pigment, which is extended with the polymer achieves the desired improvements in rheology, gloss and distinctness of image. Products prepared by this approach perform very well in a variety of paint systems, particularly in alkyd and polyester systems as well as in waterborne systems. As noted, the improved products require no additional additives or solvents, all requirements having been built into a given pigment.

Additionally, the poly(vinyl alkyl ether) exhibits unique solubility characteristics. For example, the commercially available aqueous solutions can be readily incorporated into wet pigment dispersions and thus eliminate the numerous concerns stemming from the use of organic solvent systems.

A further totally unexpected benefit has been obtained as a result of the polymer treatment of this invention. Thus, it has been discovered that such treatment results in a pronounced fluidizing effect on high solids, aqueous pigment presscakes. This discovery is particularly meaningful for current pigment technologies wherein high solids systems are preferred for purposes of economics and environmental concerns and for use in waterborne coatings. The treatment not only acts to improve performance in solvent borne systems but also facilitates processing of pigments so treated by allowing higher solids contents prior to drying and, alternatively, provides higher solids slurries to customers requiring the wet form for waterborne or other applications. Correspondingly, the present discovery provides an alternative to present processing of high solids, substantially dry, products requiring specialized equipment and further facilitates the use of the dry form in aqueous and solvent systems.

For purposes of this invention, the preferred primary pigments are gamma-quinacridone and 1,4-diketo-pyrrolopyroles, with gamma-quinacridone

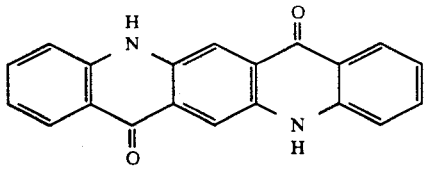

being especially preferred. It should be noted, however, that other suitable organic pigments may include alpha- and β-quinacridones, substituted quinacridones, solid solutions of quinacridones, phthalocyanines, indanthrones, isoindolinones, flavanthrones, pyranthrones, thioindigo, perylenes, mono- and dis-azo pigments and the like.

Preferred 1,4-diketo-pyrrolopyrroles correspond to the formula

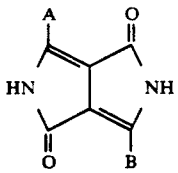

wherein A and B independently are phenyl or phenyl substituted by halogen, $C_1$-$C_6$alkyl, $C_1$-$C_6$alkoxy, $C_1$-$C_6$alkylmercapto, trifluoromethyl, cyano, dimethylamino, diethylamino, $C_2$-$C_6$alkoxycarbonyl, acetylamino, carbamoyl or sulfamoyl. The most preferred 1,4-diketo-pyrrolopyrroles are those wherein A and B independently are phenyl or p-chlorophenyl.

The poly(vinyl alkyl ether) viscosity improver applicable to the invention may be characterized by the following formula:

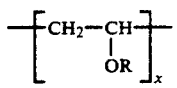

wherein R is $C_1$-$C_4$alkyl, preferably methyl and ethyl, and x is the number of repeating units to provide a molecular weight (determined by viscosity measurement) ranging from 2,000-500,000, preferably 10,000 to 100,000, and most preferably about 50,000. Poly(vinyl methyl ether) is commercially available as GANTREZ M from GAF Corp. and as LUTONAL-M40 from BASF Corp. For purposes of the instant invention, the polymer is preferably utilized as an aqueous solution, although it may also be utilized as a solution in a water-soluble diluent such as acetone, methyl ethyl ketone, and the like, to facilitate polymer introduction onto the pigment surface.

The optionally-included dispersion-improving derivatives of the primary pigments are known to those skilled in the art. Typical derivatives include, for example, the mono-, di-, tri- and tetra-phthalimidomethyl, o-carboxybenzamidomethyl and sulfonic acid derivatives. For purposes of this invention, the phthalimidomethyl and sulfonic acid derivatives are preferred for use. The preparation of such derivatives are disclosed, for example, in U.S. Pat. Nos. 2,761,868, 3,275,637, 3,386,843 and 4,256,507. The phthalimidomethyl compounds may be characterized by the formula

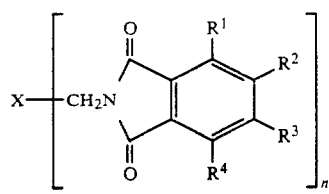

wherein X is the molecular moiety of the desired pigment, $R^1$, $R^3$ and $R^4$ are independently hydrogen or halogen, $R^2$ is hydrogen, halogen, carboxyl, nitro, N-($C_1$-$C_5$)alkyl-carbamyl, N-phenylcarbamyl or benzoylamino and n is 1-4. Sulfonates may correspond to the formula

$X(SO_3M)_m$ wherein X is the molecular moiety of the desired pigment, m is 1-2 and M is hydrogen or a metal ion. These patents and the disclosures therein are deemed to be part of and fully incorporated into the instant specification.

The compositions of this invention are prepared by dispersing the primary pigment, generally in presscake form, in water and then adding an aqueous suspension of the pigment derivative thereto if the latter is present. Adequate stirring is necessary to provide a proper slurry. The polymer solution is slowly added to the slurry which is kept at room temperature or allowed to warm to a maximum of about 32° C. Poly(vinyl methyl ether) solutions in water exhibit an inverse solubility coefficient with temperatures. Therefore., distribution of the polymer should be effected below the cloud point temperature. The slurry can be heated after adequate mixing. Generally, the slurry is maintained for an adequate period of time, e.g. 30 to 60 minutes, in order to insure adequate distribution of the polymer. The resulting pigment is then isolated by conventional means or retained in the wet dispersion for ready use in aqueous paint systems.

The polymer is present in an amount of from about 0.5 to 10%, by weight of primary pigment, preferably 2 to 6%. Lesser amounts of polymer do not provide the desired rheology improvement of the dispersion and gloss and distinction of image in the final finish, while excess amounts do not provide the added benefit to warrant the added cost and tend to decrease the strength of the pigment. When present, the pigment derivative is used in an amount of from about 1 to 10%, by weight of primary pigment, and preferably from about 2 to 6%.

As previously noted, the pigment compositions are useful in a wide variety of industrial paints and coatings, such as automotive finishing and refinishing paints based on alkyd/melamine, acrylic/melamine, acrylic-/isocyanate, saturated polyesters, in both conventional and high solids form, containing conventional additives, as well as in waterborne coatings. The pigment modification leads to improved rheological characteristics of the dispersion (i.e. markedly reduced viscosities), thus affording greater pigment concentrations and lower solvent emissions to the atmosphere during paint application. In addition, the modified products afford gloss and distinctness of image or mirror quality improvement of the automotive or other similar finishes. Finally, a pronounced fluidizing effect is achieved with aqueous presscakes having solids contents from about 20 to 50% and optionally from 30 to 45% by weight, to produce fluid, readily pumpable slurries.

The following examples further illustrate the preferred embodiments of this invention. In these examples, all parts are by weight unless otherwise noted.

Example 1

This example illustrates the preparation of a typical modified pigment system of this invention.

870 parts of gamma quinacridone (QA) aqueous presscake containing 23% solids, by weight, or 200 parts of pigment is admixed with 26 parts of 2-phthalimidomethylQA presscake containing 23% solids, by weight, of 6 parts pigment and 120 parts of a 10%, by weight, aqueous solution of poly (vinyl methyl ether), M.W. 50,000 (LUTONAL M-40 from BASF Corp.) with effective stirring over a period of one hour. The product is dried at 80° C. to constant weight and then pulverized.

In order to determine the performance characteristics thereof, the pigment is dispersed by ball milling in a conventional manner in an automotive thermosetting acrylic high solids enamel system and the resulting millbase containing 31%, by weight, modified pigment, 57.2%, by weight, total nonvolatile solids and a pigment to binder ratio of 1.18 is measured for viscosity using a Brookfield Digital Viscometer (Model RVTD) at 10 rpm, spindle #3, at 23° C., expressed in centipoises.

For purposes of comparison, a gamma quinacridone similarly treated solely with phthalimidomethyl QA is subjected to a similar measurement. The results are noted in the following table:

|  | Viscosity (cps) |
|---|---|
| Gamma-QA/phthalimidomethyl QA | 5280 |
| Product of Example I | 880 |

The improvement in viscosity is quite evident, particularly in comparison to the system treated solely with the pigment derivative.

EXAMPLE II

This example further illustrates the benefits derived from the presence of the polymer.

When Example I is repeated exactly as described but without the phthalimidomethyl QA, the resulting products show the following performance in an alkyd paint system (Setal 84 from Kunsthargfabriek Synthesis B. V. Holland) with the resulting millbase containing 12.5% by weight, modified pigment, 54.3%, by weight, total non-volatile solids and a pigment to binder ratio of 0.3 based on the same measured parameters.

|  | Viscosity (cps) |
|---|---|
| Untreated gamma-QA Pigment | 1,970 |
| Product of Example II | 1,520 |
| Product of Example I | 350 |

It is seen that the pattern of substantial improvement is likewise present in a different coating system.

After the above noted letdown of the millbase and paint preparation, a masstone paint panel (10cm × 15cm. 10 gauge aluminum, gray acrylic primed panel spray painted to visual hiding over a black and white checkerboard) is prepared and dried and gloss is measured with a gloss meter Glossguard System 20/60/85 (Model G67526). A very obvious gloss improvement is noted for the polymer-treated systems in contrast to the untreated gamma QA.

EXAMPLE III

The product of Example I is prepared in an identical manner with the exception that the phthalimidomethyl QA is omitted in favor of 4 parts QA monosulfonic acid (based on QA). Viscosity data based on the same parameters in the resin system of Example II is as follows:

|  | Viscosity (cps) |
|---|---|
| Untreated gamma QA pigment | 1970 |
| Product of Example III | 1120 |

Utilizing the gloss procedure of Example II, a corresponding improvement in gloss is noted.

EXAMPLE IV 50 parts 1,4-diketo-3,6-di-(4-chlorophenyl)-pyrrolo-[3,4-c]-pyrrole is dispersed for 1 hour at room temperature in 500 ml water. Thereafter, 30 parts of a 10%, by weight, poly(vinyl methyl ether) (LUTONAL-M40) aqueous solution is added and slurred an additional 4 hours. The slurry is then filtered and washed with one liter of water. After vacuum drying at 80° C. and pulverizing, the pigment is tested in (A) the high solids enamel of Example I and (B) alkyd paint (see Example II) systems vs. an untreated control and viscosities determined on the basis of the parameters in Example I. The results are as follows:

|  | Viscosity @ RPM (cps) | | |
|---|---|---|---|
|  | 1 | 10 | 100 |
| Resin A |  |  |  |
| Control | 760 | 280 | 100 |
| Product of Example IV | 220 | 120 | 65 |
| Resin B |  |  |  |
| Control | 1530 | 340 | 170 |
| Product of Example IV | 540 | 230 | 160 |

A significant lowering of viscosity is exhibited for the treated pigments in each instance.

EXAMPLE V

Indanthrone pigment presscake containing 85 grams pigment, 2.7 grams resin derivative extender and 6 grams surface modifier (sulfonated derivative of indanthrone) is mixed at room temperature with 50 ml of a 10%, by weight, aqueous solution of poly(vinyl methyl ether). After vacuum drying at 80° C. and pulverizing, the pigment is tested in high solids enamel (A) and alkyd paint (B) systems vs. a similarly prepared pigment without polymer treatment. The results are as follows:

| | Viscosity @ RPM (cps) | | |
|---|---|---|---|
| | 1 | 10 | 100 |
| Resin A | | | |
| Control | 6440 | 870 | 180 |
| Product of Example V | 5230 | 650 | 155 |
| Resin A* | | | |
| Control | 2670 | 390 | 115 |
| Product of Example V | 340 | 170 | 85 |
| Resin B | | | |
| Control | 2420 | 520 | 110 |
| Product of Example V | 890 | 180 | 80 |

*modified with AB dispersant 1020 from DuPont

A significant lowering of mill base viscosity is observed in each instance.

EXAMPLE VI

The procedure of Example I is repeated with the exception that the amount of poly(vinyl methyl ether) is varied as noted in the following table and the Setal 84 from Example II is utilized as the binder system. Viscosity is determined as in Example I at various spindle speeds.

| | PVME (%) (based on pigment) | Viscosity @ rpm (cps) | | |
|---|---|---|---|---|
| | | 10 | 50 | 100 |
| Gamma Quinacridone* | — | 2800 | 1030 | 692 |
| Gamma QA/phthalimidomethyl QA | — | 390 | 320 | 291 |
| Treated gamma quinacridone | 0.5 | 330 | 270 | 256 |
| Treated gamma quinacridone | 1.0 | 310 | 262 | 252 |
| Treated gamma quinacridone | 2.0 | 310 | 254 | 251 |

*RT-759-D from CIBA-GEIGY Corp.

Significant viscosity reductions are thus evident even at very low polymer application levels.

EXAMPLE VII

This example illustrates the fluidizing effect on high solids systems of the polymer treatment of this invention.

A substantially solid quinacridone presscake (precursor to RT-742-D from CIBA-GEIGY Corp.), 250 grams at 38.5% solids, by weight, is hand mixed with 5 grams of a 10%, by weight, aqueous solution of poly(vinyl methyl ether) (see Example I) and 2.2 grams of a NUOSEPT 95 preservative. The mixture is then sand milled with 0.8 mm glass beads to a smooth dispersion. The 37% pigment dispersion exhibits the following viscosity profile (see Example I):

| RPM (Spindle #3) | Viscosity (cps) |
|---|---|
| 100 | 210 |
| 50 | 280 |
| 20 | 400 |
| 10 | 510 |
| 5 | 560 |

It is thus seen that the high solids aqueous dispersion exhibits unexpectedly good rheology, i.e. fluidity.

When the dispersion is incorporated into a conventional latex tint base, excellent flocculation behavior and twice the tinting strength of a commercially available Red B aqueous dispersion are observed.

EXAMPLE VIII

A particle size reduced quinacridone violet presscake (precursor to RT-795-D from CIBA-GEIGY Corp.) is reslurried, held at a pH of 9–10 for two hours and filtered and washed to pH 7.5. 476 grams of the substantially solid presscake at 42% solids are blended with 29 grams of a 21% solids, phthalimidomethyl quinacridone presscake and 20 grams of a 10% aqueous solution of poly(vinyl methyl ether). The resultant mix with autogenous pH of 8.2 and 37% solids content is easily poured from the blender container.

EXAMPLE IX

A substantially solid presscake (100 grams) containing gamma quinacridone and 4% based on weight of pigment, of quinacridone monosulfonate is mixed with 5 grams of a 10%, by weight, poly(vinyl methyl ether) solution. The pH of the resultant mix is adjusted to 9 with 2-amino-2-methyl-1-propanol. Water is added to a final solids content of 40%, by weight, yielding a pourable fluid slurry.

EXAMPLE X

A substantially solid presscake made from a particle size reduced solid solution of gamma quinacridone and 2,9-dimethyl quinacridone (transparent Red B presscake-precursor to RT-333-D from CIBA-GEIGY Corp.), 936 grams and 32% solids content, is blended with 30 grams of 10%, by weight, poly(vinyl methyl ether) solution and 4.6 grams of 2-amino-2-methyl-1-propanol to a final pH of 8.5. The blend is effected in a laboratory, one gallon planetary mixer until lump free (about one hour). The resultant 31% solids blend is easily strained through a 20 mesh screen.

Summarizing, it is seen that this invention provides modified pigment compositions with significantly improved rheological, fluidity, gloss and distinction of image properties. Variations may be made in proportions, procedures and materials without departing from the scope of the invention as defined by the following claims.

What is claimed is:

1. A pigment composition comprising an organic pigment surface modified with from about 0.5 to 10%, by weight of said pigment, of a polyvinyl methyl ether having a molecular weight ranging from 2,000 to 500,000.

2. The composition of claim 1, wherein said organic pigment is a quinacridone or a substituted quinacridone or a solid solution of quinacridones.

3. The composition of claim 2, wherein said quinacridone is gamma-quinacridone.

4. The composition of claim 1, wherein said organic pigment is a 1,4-diketo-pyrrolo-pyrrole.

5. The composition of claim 1, wherein said organic pigment is an indanthrone.

6. The composition of claim 1 which also contains from about 1 to 10%, by weight of said pigment, of a dispersion improving derivative of said pigment.

7. The composition of claim 6, wherein said organic pigment is a quinacridone.

8. The composition of claim 7, wherein said quinacridone is gamma-quinacridone.

9. The composition of claim 7, wherein said derivative is a phthalimidomethyl, sulfonic acid or carboxybenzamidomethyl derivative of said quinacridone.

10. The composition of claim 6, wherein said poly vinyl methyl ether) is present in a concentration of 2-6%, by weight of said pigment.

11. The composition of claim 6, wherein said poly(vinyl lower alkyl ether) has a molecular weight of 10,000 to 100,000.

12. The composition of claim 6 which comprises gamma-quinacridone, 2 to 6% of a 2-phthalimidomethyl derivative of quinacridone and 2 to 6% of poly vinyl methyl ether, said percentages being based on the weight of pigment.

13. The composition of claim 6 which comprises gamma-quinacridone, 2 to 6% of a sulfonic acid derivative of quinacridone and 2 to 6% of poly vinyl methyl ether, said percentages being based on the weight of pigment.

14. A process for improving the rheological and stability characteristics of an organic pigment dispersion and the gloss and distinctness properties of a finish prepared therefrom which comprises treating said organic pigment with from about 0.5 to 10% of a poly vinyl methyl ether having a molecular weight of 2,000 to 500,000, said percentage being based on the weight of pigment.

15. The process of claim 14, wherein said organic pigment is also treated with from about 1 to 10%, by weight of said pigment, of a dispersion-improving derivative of said pigment.

16. The process of claim 15, wherein said organic pigment is a quinacridone, or a substituted quinacridone or a solid solution of quinacridones, and said derivative is phthalimidomethyl or sulfonic acid derivative of quinacridone.

17. The process of claim 16, wherein said quinacridone is gamma-quinacridone and said poly(vinyl methyl ether) is present in a concentration of 2 to 6%, by weight of said pigment.

18. A process for increasing the fluidity of an aqueous organic pigment dispersion having a solids content ranging from 20 to 50%, by weight, which comprises treating said organic pigment with from about 0.5 to 10% of a poly(vinyl lower alkyl ether) having a molecular weight of 2,000 to 500,000, said percentage being based on the weight of pigment.

19. The process of claim 18, wherein said organic pigment is also treated with from about 1 to 10%, by weight of said pigment, of a dispersion-improving derivative of said pigment.

20. The process of claim 19, wherein said organic pigment is a quinacridone or a substituted quinacridone or a solid solution of quinacridones, and said derivative is a phthalimidomethyl or sulfonic acid derivative of quinacridone.

21. The process of claim 20, wherein said quinacridone is gamma-quinacridone and said poly vinyl methyl ether is present in a concentration of 2 to 6%, by weight of said pigment.

* * * * *